(12) United States Patent
Sugita et al.

(10) Patent No.: US 9,335,906 B2
(45) Date of Patent: May 10, 2016

(54) INFORMATION PROCESSING APPARATUS, CONTROL METHOD THEREOF, AND RECORDING MEDIUM

(71) Applicant: CANON KABUSHIKI KAISHA, Tokyo (JP)

(72) Inventors: Norio Sugita, Yokohama (JP); Toshiyuki Noguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 234 days.

(21) Appl. No.: 13/744,780

(22) Filed: Jan. 18, 2013

(65) Prior Publication Data

US 2013/0191783 A1    Jul. 25, 2013

(30) Foreign Application Priority Data

Jan. 20, 2012    (JP) .................................. 2012-010267

(51) Int. Cl.
*G06F 3/0484*    (2013.01)
*G06F 3/0482*    (2013.01)

(52) U.S. Cl.
CPC .......... *G06F 3/04842* (2013.01); *G06F 3/0482* (2013.01)

(58) Field of Classification Search
None
See application file for complete search history.

(56) References Cited

U.S. PATENT DOCUMENTS

| 2001/0015756 A1* | 8/2001 | Wilcock et al. ............... 348/158 |
| 2004/0010497 A1* | 1/2004 | Bradley et al. ............... 707/100 |
| 2009/0284551 A1* | 11/2009 | Stanton ........................ 345/629 |
| 2010/0259641 A1* | 10/2010 | Fujimoto .................. 348/231.3 |
| 2012/0162249 A1* | 6/2012 | Tsuda et al. ................. 345/629 |

FOREIGN PATENT DOCUMENTS

| JP | 2010026975 A | 2/2010 |
| JP | 2011-28560 A | 2/2011 |
| JP | 4623088 A | 2/2011 |

\* cited by examiner

*Primary Examiner* — Weilun Lo
*Assistant Examiner* — Stella E Higgs
(74) *Attorney, Agent, or Firm* — Canon USA Inc. IP Division

(57) ABSTRACT

An information processing apparatus includes a decision unit configured to determine whether the existence of the plurality of content data pieces is to be displayed using individual information corresponding to each piece of the content data or using representative information that combines the content data pieces into one based on the display position of the information indicating existence of each piece of the content data, and a display control unit configured to control a display unit to display the information indicating existence of the content data based on the display position based on a determined result of the decision unit. The display control unit controls the display unit to change a display form of the representative information according to whether at least one of the plurality of content data pieces of which existence is displayed by being combined into the representative information satisfies a predetermined condition.

12 Claims, 7 Drawing Sheets

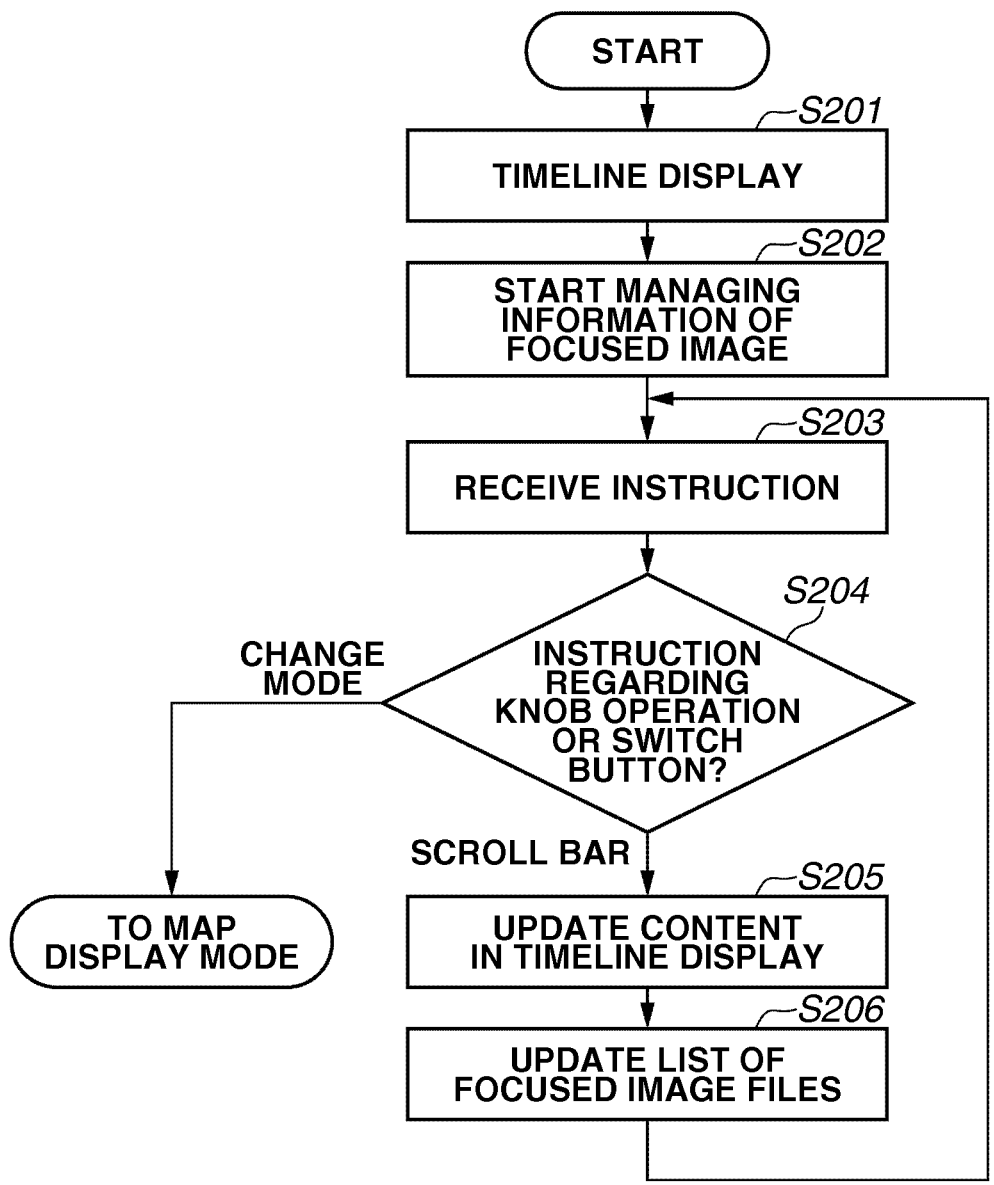

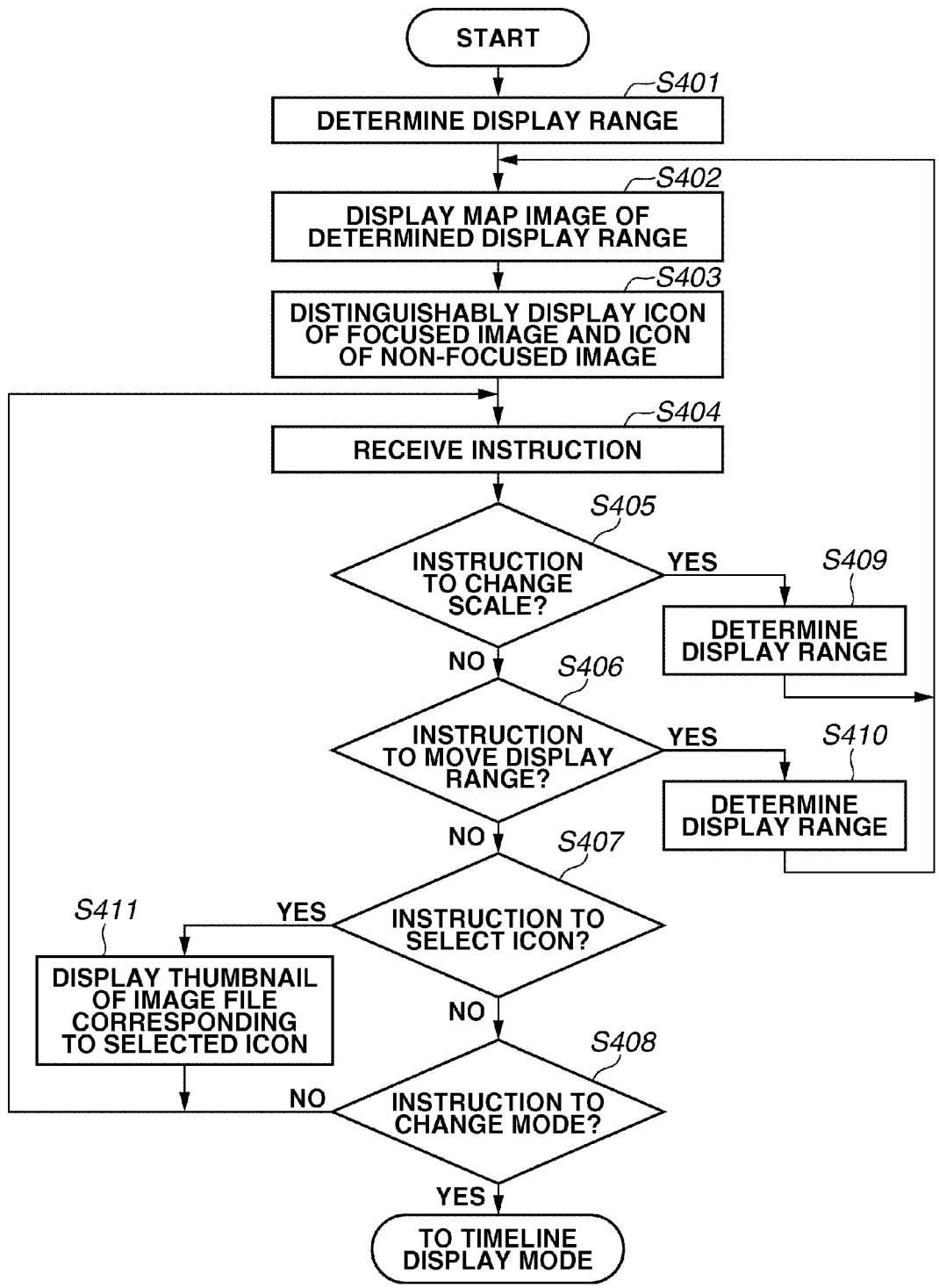

INFORMATION PROCESSING APPARATUS, CONTROL METHOD THEREOF, AND RECORDING MEDIUM

BACKGROUND OF THE INVENTION

1. Field of the Invention

The present invention generally relates to information processing and, more particularly, to an information processing apparatus for displaying content data on a screen according to its attribute information.

2. Description of the Related Art

In recent years, along with the increase in the storage capacity of storage devices, users have many opportunities to browse and edit images while displaying a large number of images on screens. In addition, according to widespread use of the global positioning system (GPS) in recent years, an imaging position at which an image is captured can be displayed on a map. Under such circumstances, various image displaying methods which are helpful in efficiently browsing image data including an enormous volume of position information has been discussed.

For example, some image displaying methods may switch a display mode between a list display mode for displaying a list of images and a map display mode for displaying the image on an appropriate position on a map based on the imaging position thereof. Thus, a user can select a desirable display method.

However, if there are a large number of images, many images are likely to be taken at close imaging positions. In such a case, if the images are displayed in the map display mode, depending on the scale of the map displayed, the images may be too closely arranged on the map that the map itself is covered by the images or the user may find difficulty in browsing each image. Thus, in order to solve such issues, there is discussed a method for combining icons, which present the respective imaging positions of the images, into a representative icon if the icons are too closely arranged and the density of the icons is equal to or more than a predetermined value.

However, the issues that occur due to handling of a large number of images is not limited to the above-described ones. Other issues include, for example, a user may lose sight of a focused image due to indistinguishable display of images the user focused on and other images. If icons of a plurality of images are combined into one icon or if the display mode is changed to a different mode, a user is furthermore likely to lose sight of a focused image.

SUMMARY OF THE INVENTION

According to an aspect of the present disclosure, an information processing apparatus includes an acquisition unit configured to acquire a plurality of content data pieces and attribute information including position information about the content data, a determination unit configured to determine a display position of information indicating existence of the content data based on the position information about the content data, a decision unit configured to determine whether the existence of the plurality of content data pieces is to be displayed using individual information corresponding to each piece of the content data or using representative information that combines the content data pieces into one based on the display position of the information indicating existence of each piece of the content data, and a display control unit configured to control a display unit to display the information indicating existence of the content data based on the display position based on a determined result of the decision unit, wherein the display control unit controls the display unit to change a display form of individual information corresponding to the content data which satisfies a predetermined condition and a display form of individual information corresponding to the content data which does not satisfy the predetermined condition, and wherein the display control unit controls the display unit to change a display form of the representative information according to whether at least one of the plurality of content data pieces of which existence is displayed by being combined into the representative information satisfies a predetermined condition.

According to the aspect of the present disclosure, if a plurality of contents is combined, possibility of a user losing sight of the content the user focuses on can be reduced.

Further features of the present disclosure will become apparent from the following description of exemplary embodiments (with reference to the attached drawings).

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

FIG. 2 is a flowchart illustrating an operation of the information processing apparatus in a timeline display mode according to the first exemplary embodiment.

FIG. 4 is a flowchart illustrating an operation of the information processing apparatus in a map display mode according to the first exemplary embodiment.

DESCRIPTION OF THE EMBODIMENTS

Various exemplary embodiments, features, and aspects of the disclosure will be described in detail below with reference to the drawings.

Figure 1:
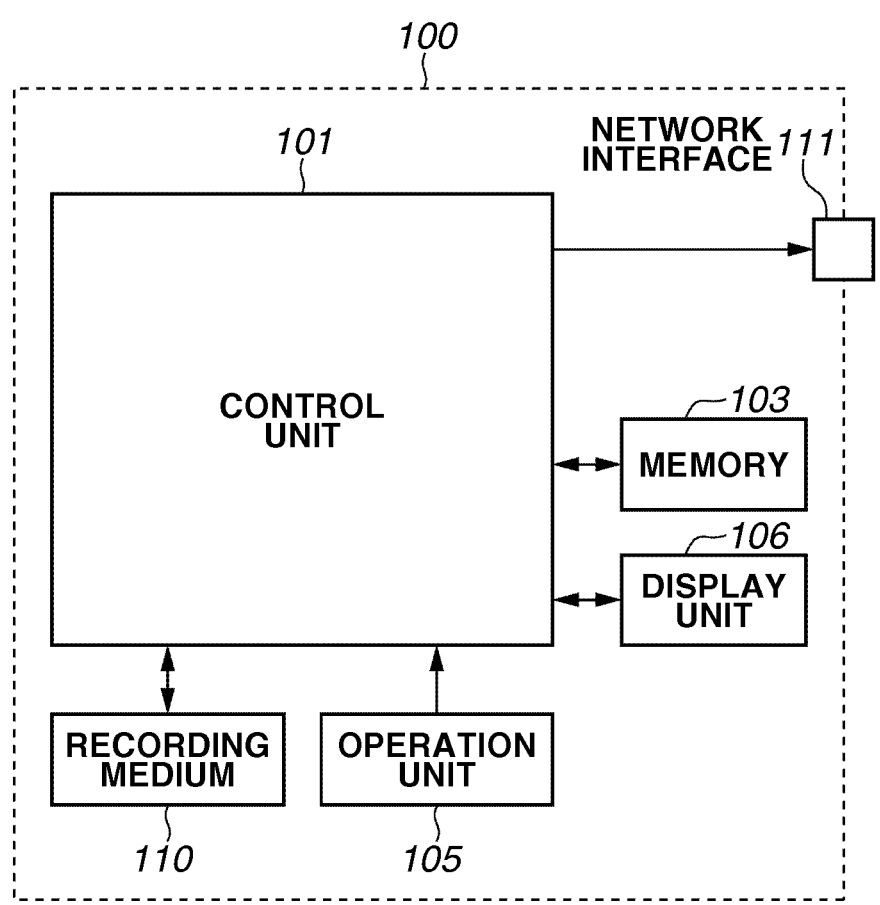
FIG. 1 is a block diagram of an information processing apparatus according to a first exemplary embodiment of the present disclosure.

FIG. 1 illustrates a configuration of an information processing apparatus according to a first exemplary embodiment. The information processing apparatus according to the present exemplary embodiment may include, for example, a personal computer, a cellular phone, what is referred to as a tablet device, or the like.

A control unit 101 controls each unit of an information processing apparatus 100 according to an input signal and a program described below. In place of the control unit 101, a plurality of hardware units may control the entire apparatus by sharing the processing.

A memory 103 is used as a buffer memory that temporarily stores data, an image display memory of a display unit 106, and a working area of the control unit 101.

An operation unit 105 is used for receiving an instruction from a user to the information processing apparatus 100. The operation unit 105 may include, for example, a keyboard and a pointing device. A mouse, a touch pad, a touch panel, or the like can be used as the pointing device.

The display unit 106 displays data stored in the information processing apparatus 100 or data which is supplied thereto. For example, the display unit 106 displays a display area on a window of an information management application program. The information management application program will be described below. The information processing apparatus 100 does not necessarily include the display unit 106. However, the information processing apparatus 100 needs to be able to be connected to the display unit 106 and at least includes a display control function for controlling the display of the display unit 106.

A recording medium 110 stores various programs executed by the control unit 101, an operating system (OS), and information pieces, such as content information including image files and audio files, an information management application program, and map information. According to the present exemplary embodiment, image files are in an exchangeable image file format (EXIF) Joint Photographic Experts Group (JPEG) format. If an image is in the EXIF-JPEG format, a thumbnail and attribute information are recorded at the header of the file. The recording medium 110 may be mountable/detachable from the information processing apparatus 100 or may be integrated in the information processing apparatus 100. In other words, the information processing apparatus 100 may at least include means for accessing the recording medium 110.

A network interface 111 is used, for example, for connecting the information processing apparatus 100 to a network line such as the Internet. According to the present exemplary embodiment, it is described that information about an image file or a map is stored in the recording medium 110, however, the present disclosure can also be realized when such information is obtained from an external apparatus via the network interface 111. The information processing apparatus according to the present exemplary embodiment may be realized by a single information processing apparatus or a plurality of information processing apparatuses in which functions are shared among them as necessary. If the information processing apparatus according to the present exemplary embodiment includes a plurality of information processing apparatuses, the apparatuses are communicably connected with each other, for example, by a local area network (LAN).

Next, the above-described information management application program (i.e., an information management application) will be described. The information management application according to the present exemplary embodiment includes a timeline display mode and a map display mode. The timeline display mode is used for arranging and displaying thumbnails of image files recorded in the recording medium 110 in the order of the imaging date and time. The map display mode is used for displaying imaging positions of the image files recorded in the recording medium 110 on a map.

Figure 3A:
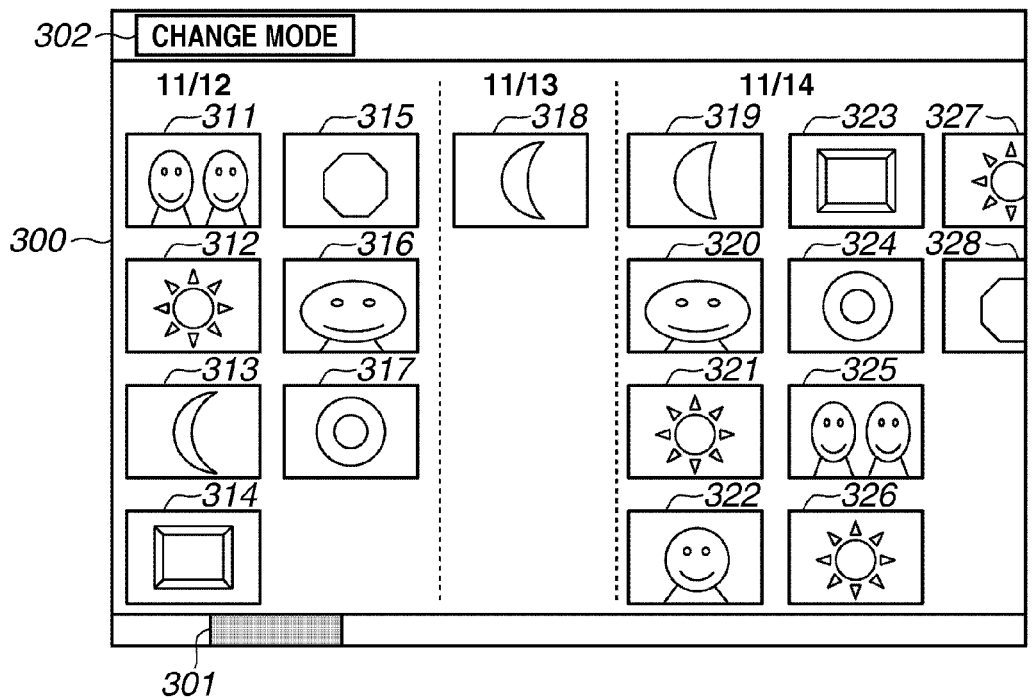
FIGS. 3A and 3B illustrate examples of a display screen in the timeline display mode according to the first exemplary embodiment.
Figure 3B:
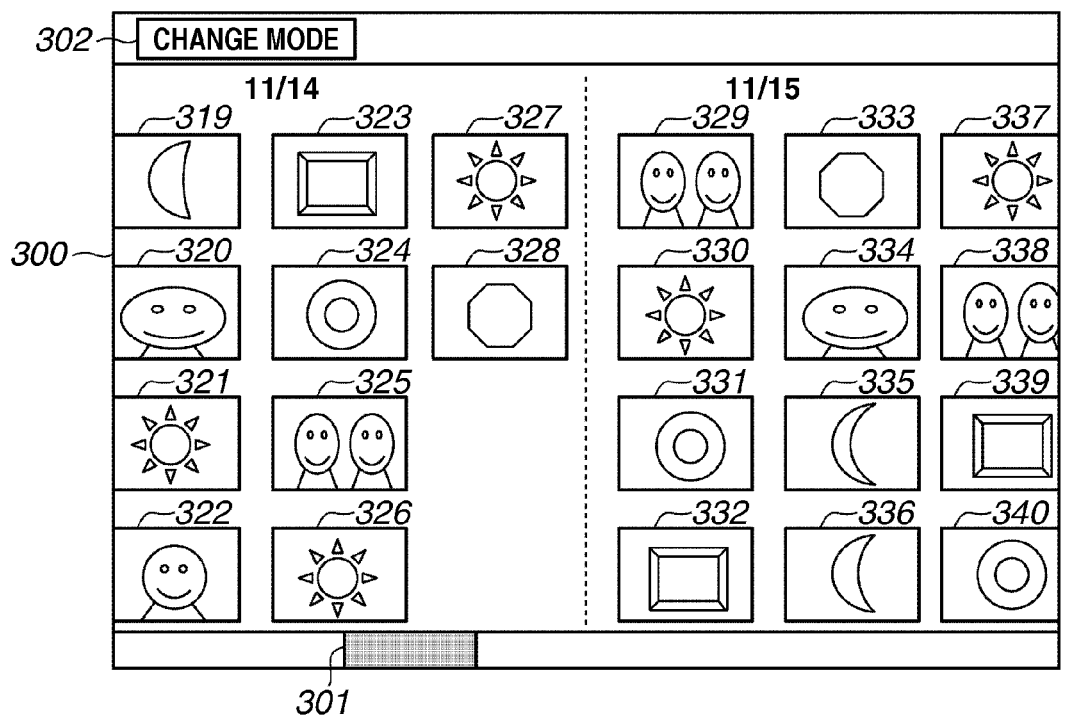
Figure 5A:
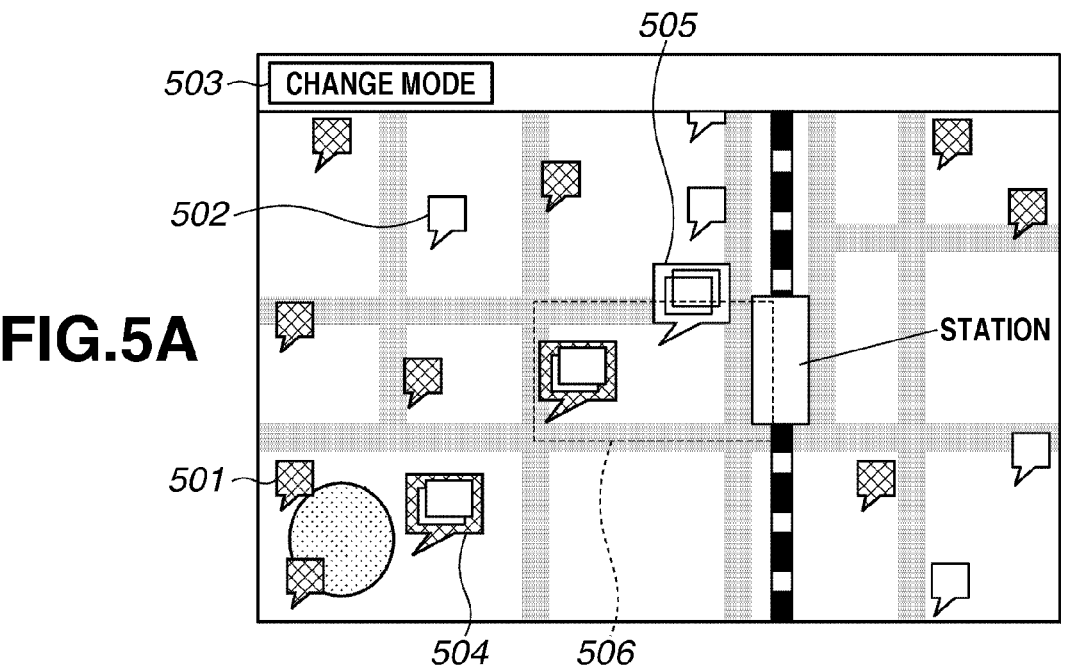
FIG. 5A illustrates an example of a display screen in the map display mode according to the first exemplary embodiment.
Figure 5B:
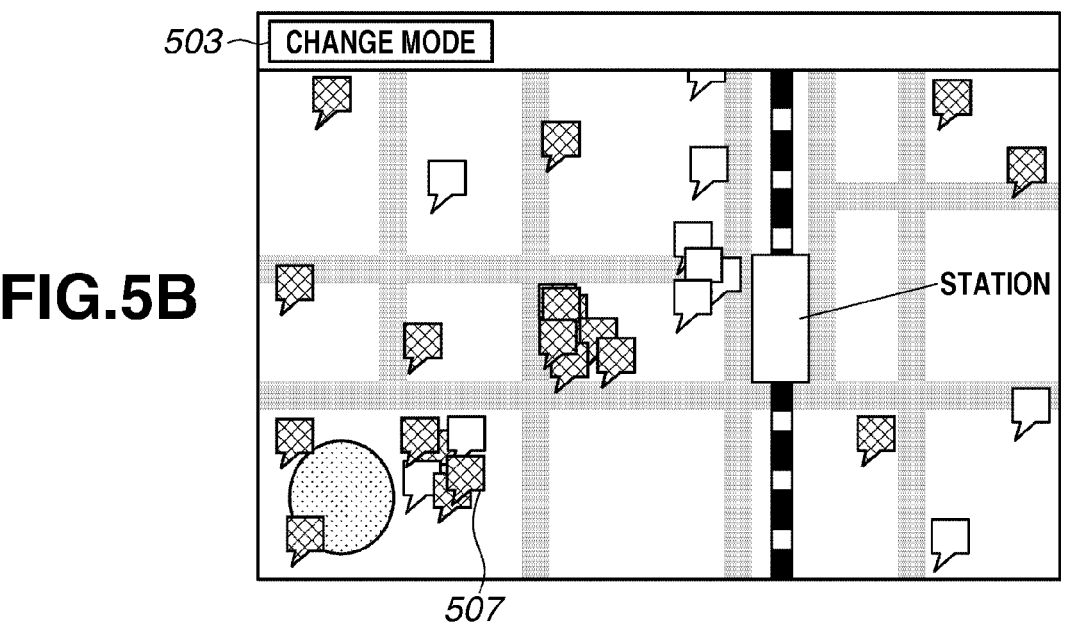
FIG. 5B illustrates another example of the display screen in the map display mode according to the first exemplary embodiment.
Figure 5C:
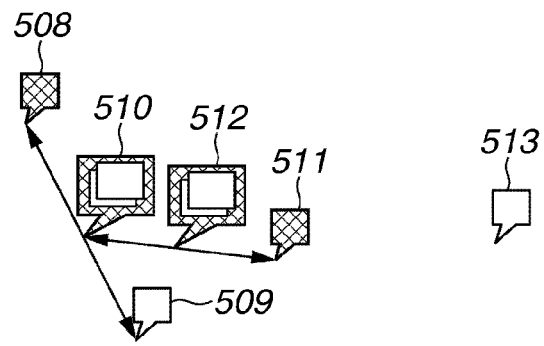
FIG. 5C is a schematic diagram illustrating processing for combining icons and displaying the combined icons in the map display mode according to the first exemplary embodiment.

According to the present exemplary embodiment, the position information and the date and time information are recorded in the header area of each image file. The position information and the date and time information respectively provide the imaging position and the imaging date of the image file. The control unit 101 that executes the information management application appropriately displays the thumbnails of the image files by referencing such position information and date and time information. Examples of an interface in each mode are illustrated in FIGS. 3A, 3B, 5A, 5B, and 5C. FIGS. 3A and 3B illustrate examples of the interface in the timeline display mode. FIGS. 5A to 5C illustrate examples of the interface in the map display mode. These two modes can be switched by a user's instruction.

The operations of the information processing apparatus 100 in each mode will now be described.

First, the operation of the information processing apparatus in the timeline display mode will be described.

FIG. 2 is a flowchart illustrating the operation of the information processing apparatus in the timeline display mode. The processing in this flowchart is started when the control unit 101 executes the information management application and is realized when the control unit 101 controls each unit of the information processing apparatus 100 according to the OS and the information management application.

In step S201, the control unit 101 displays the thumbnails of the image files recorded in the recording medium 110 in the display area of the window in the date and time order the image files have been created. For example, the control unit 101 displays the thumbnails as illustrated in the screen in FIG. 3A. FIG. 3A illustrates an example of a screen displayed according to the processing in step S201. In order to display a screen such as the one illustrated in FIG. 3A, in step 201, the control unit 101 sorts identifications (IDs) of the image files recorded in the recording medium 110 by the order of the imaging date and time thereof. According to the present exemplary embodiment, a unique ID is assigned to each of the image files recorded in the recording medium 110. The control unit 101 manages the image files based on such an ID.

There is a certain limit regarding the number of thumbnails that can be displayed in a display area 300. Thus, the number of thumbnails that can be displayed is determined based on a display size of a thumbnail and a size of the display area. If the sorting of the IDs and the determination of the number of thumbnails to be displayed are completed, a number of IDs corresponding to the number of thumbnails that can be displayed are acquired from the sorted IDs based on the order corresponding to a position of a knob 301 as a reference.

Then, thumbnails are read out from the headers of the image files that correspond to such IDs. The thumbnails which have been read out are sequentially displayed from an upper left portion of the display area. As a result, a screen, as the one illustrated in FIG. 3A, is displayed. According to the above-described processing, the thumbnails of the image files are displayed in the display area 300 in FIG. 3A from the left side in ascending order (chronological order) based on the imaging date and time. In other words, the thumbnails of the image files displayed on the left side are those of the old imaging date and time, and the thumbnails of the image files on the right side are those of the recent imaging date and time. Further, according to the example illustrated in FIG. 3A, the thumbnails are displayed by the imaging date. If the thumbnails of the image files created in one day do not fit in one vertical row, another row is added. In this manner, the width corresponding to one day is determined according to the number of image files which have been created that day.

In addition, a scroll bar 302 including the knob 301 is displayed on the screen. The position of the knob 301 with respect to the scroll bar 302 indicates the order of the thumbnails displayed in the display area. For example, when there are 100 image files and the number of thumbnails displayed in the display area is 20, and further, if the knob 301 is at the left end of the scroll bar 302, the thumbnails of the image files based on the first to the 20th IDs are displayed in the display area. As described above, since the IDs are sorted in the imaging date and time, the thumbnails are arranged and displayed in the date and time order. In the following description, a range of the IDs of the image files that correspond to the thumbnails displayed in the display area of the sorted IDs is referred to as an image display range.

By the user operating the knob 301 via the operation unit 105, the image display range can be changed according to the order of the sorted IDs. In other words, the thumbnails displayed in the display area can be changed in the order of the sorted IDs according to the position of the knob 301. For example, if the user moves the knob 301 from the left end to the right, the thumbnails of the image files which have been created recently will be displayed in place of the thumbnails of the image files of the older date and time. In the above-described example, for example, the thumbnails of the image files based on the 21st to the 30th IDs will be displayed in place of the thumbnails of the image files based on the first to the 10th IDs. In this manner, a part of the list of thumbnails of the image files arranged in the imaging date and time order is displayed in the display area 300 of the window, and an interface can be provided which changes the display position of the part of the list of thumbnails by the user operating the knob 301.

A switch button 303 used for changing the mode to the map display mode is displayed in the screen in FIG. 3A. When the user selects the switch button 303 via the operation unit 105, the user can input an instruction to shift the timeline display mode to the map display mode. The size of the display area may be changed according to a change in a window size of the information management application. Further, the display size of the thumbnails can be changed according to the operation of the user. The processing in step 201 is executed in parallel with the processing in steps S202 and S203 described below.

In step S202, which is performed in parallel with the processing in step S201, the control unit 101 makes a list of IDs of respective image files corresponding to the thumbnails currently displayed in the display area 300 as a list of IDs of the image files the user focuses on. Then, the control unit 101 stores the list. According to the example in FIG. 3A, among the image files which have been created from November 12 to 14, IDs of the image files corresponding to thumbnails 311 to 334 displayed in the display area 300 are stored in the list of the focused image files. In this manner, according to the present exemplary embodiment, the image files corresponding to the thumbnails which are currently displayed are treated as the image files the user focuses on. The stored IDs are used in the map display mode. How the stored IDs are used will be described below. In addition, the list of the focused image files is updated in real time when the user moves the knob 301 and the thumbnails displayed in the display area 300 are changed.

In step S203, the control unit 101 receives an instruction from the user. The processing in this step is also executed in parallel with the processing in steps S201 and S202.

In step S204, the control unit 101 determines whether an operation of the knob 301 or an instruction regarding the selection of the switch button 303 is received. If it is determined that the operation of the knob 301 is received (SCROLL BAR in step S204), the processing proceeds to step S205.

In step S205, the control unit 101 updates the content displayed in the display area 300 according to the user's operation of the knob 301. More specifically, the thumbnails are read out and displayed in the display area 300 according to the position where the knob 301 is moved. This processing will be described with reference to FIG. 3B.

FIG. 3B illustrates an example of the screen in a case where the knob 301 is moved to the right side from the state illustrated in FIG. 3A so that the thumbnails of newer image files are displayed. In this case, the thumbnails 311 to 318 of the image files which have been created from November 12 to November 13 and displayed in FIG. 3A are scrolled out and not displayed on the screen. On the other hand, thumbnails 329 to 340 of the image files which are among the image files created in November 15 are read out from the recording medium 110, and scrolled in and displayed on the screen. The thumbnails 329 to 340 are those newly read out from the recording medium 110 according to the position of the knob 301.

According to the example in FIG. 3B, since the number of thumbnails that can be displayed in the display area 300 in the vertical direction is four, the thumbnails are read out in units of four in the order of the sorted IDs. The thumbnails which have already been displayed in FIG. 3A are not read out from the recording medium 110 and only moved to the right side. By repeating this operation, the user can display a desired image file from the image files recorded in the recording medium 110.

In step S206, according to the processing similar to that in step S202, the control unit 101 updates the list of the focused image files which are stored. According to the update of the display, the IDs of the image files of the thumbnails 311 to 318 stored in step S202 are deleted from the list, and the IDs of the image files of the thumbnails 329 to 340 which are newly displayed are added to the list. In other words, the image files of the thumbnails 311 to 318 are determined that they are no longer the image files the user focuses on. Then, the image files of the thumbnails 329 to 340 are regarded as the focused image files together with the image files of the thumbnails 319 to 328.

According to the example in FIG. 3B, not all of the thumbnails of the image files created on November 15 are displayed. Among the image files created on November 15, the image files that correspond to the thumbnails which are not displayed on the screen are not added to the list, and thus are not treated as the image files that the user focuses on. Further, according to the present exemplary embodiment, even if the entire thumbnail is not displayed (e.g., the thumbnails at the left end or the right end of the screen in FIGS. 3A and 3B), the image file of such a thumbnail is added to the list and treated as an image the user focuses on.

When the processing in step S206 is completed, the processing returns to step S203, and the control unit 101 waits until it receives the next instruction.

On the other hand, in step S204, if the control unit 101 determines that an instruction regarding the selection of the switch button 303 is received (CHANGE MODE in step S204), the mode is changed to the map display mode.

The operation of the information processing apparatus in the timeline display mode is as described above. According to the timeline display mode of the present exemplary embodiment, the ID of the image file the user focuses on is stored. Next, the operation of the information processing apparatus in the map display mode using the ID of the focused image file will be described.

FIG. 4 is a flowchart illustrating the operation of the information processing apparatus 100 in the map display mode.

The processing in this flowchart is started, for example, when an instruction to shift the mode to the map display mode is received in step S204 in FIG. 2, and realized when the control unit 101 controls each unit of the information processing apparatus 100 according to the OS and the information management application.

In step S401, the control unit 101 reads out, from the recording medium 110, a map image of an appropriate display range and scale in which the imaging position of the image file that the user focuses on in the timeline display mode is fitted into the display area of the map, and displays the map in the display area of the window. The image file the user focuses on can be searched for by referencing the ID in the list of the focused image files stored in the timeline display mode.

If the mode is shifted from the state as illustrated in FIG. 3B to the map display mode, the display range and the scale are determined based on the position information pieces of the image files of the thumbnails 323 to 346 displayed in the display area 300 and the size of the display area. More specifically, the control unit 101 obtains the maximum value and the minimum value of the latitude and the longitude from the position information pieces of the image files that the user focuses on. From these values, points having the maximum latitude and the maximum longitude and points having the minimum latitude and the minimum longitude are obtained. Then, a maximum scale value of the display area into which a rectangular area having these two points as diagonal points is fitted is determined. Further, a predetermined margin that corresponds to the determined scale is set for each of the points having the maximum latitude and the maximum latitude longitude and the points having the minimum latitude and the minimum latitude longitude. Lastly, a rectangular area having the two points with a margin as the diagonal points are determined as the display range. The predetermined margin is set so that an icon described below fits into the display area to make the icon easy to see.

In step S402, the control unit 101 reads out the map image of the determined display range and scale from the recording medium 110 and displays it in the display area of the window.

In step S403, among the image files stored in the recording medium 110, the control unit 101 searches for an image file having the imaging position included in the determined display range. Wherein, for example, the control unit 101 performs as an acquisition unit. Then, an icon indicating the existence of the searched image file is displayed in the display area. Subsequently, the control unit 101 determines whether the searched image file is included in the list. Then, according to the result of the determination, the icon is changed to a different icon.

More specifically, the icon that indicates the imaging position of the image file the user focuses on in the timeline display mode and the icon that indicates the imaging position of the image file the user did not focus on in the timeline display mode are displayed in a distinguishable manner. In other words, an icon indicating an imaging position of an image file having a thumbnail displayed in the display area 300 in the timeline display mode and an icon indicating an imaging position of an image file having a thumbnail not displayed in the display area 300 are displayed in a distinguishable manner.

For example, as illustrated in FIG. 5A, an icon indicating an imaging position of an image file the user focuses on in the timeline display mode is displayed as an icon 501 and an icon indicating imaging position of an image file the user does not focus on in the timeline display is displayed as an icon 502. In the following description, an icon indicating an imaging position of a focused image file is referred to as a focused icon, and an icon indicating an imaging position of an image file other than a focused image file is referred to as a non-focused icon.

For example, if the mode is shifted to the map display mode from the state in FIG. 3B, the image files of the thumbnails 319 to 340 are regarded as the images files the user is focusing on. Thus, the icons that indicate the imaging positions of these image files are displayed using a focused icon such as the icon 501. On the other hand, in the state in FIG. 3B, the image files of the thumbnails 311 to 318 displayed in FIG. 3A and other image files recorded in the recording medium 101 are not the image files the user is focusing on. Thus, the icons that indicate the imaging positions of these image files are displayed using a non-focused icon such as the icon 502 if the imaging positions are included in the display area. If the imaging positions are not included in the display area, the icons are not displayed.

If a large number of icons are displayed on a map, a user may find difficulty in viewing the map or selecting an icon from the map. In order to avoid such issues, icons of which display positions (positions on the map image that corresponds to the imaging positions of the files) are close to one other on the map are combined into one representative icon and displayed. The representative icon is displayed in a form different from the icons that are separately displayed. For example, the representative icon is displayed as a representative icon 504 or a representative icon 505. The representative icon 504 includes at least one or more focused icons in the combined icons. On the other hand, the representative icon 505 does not include a focused icon in the combined icons.

More specifically, according to the present exemplary embodiment, a representative icon which includes an icon that indicates the imaging position of the image file the user focuses on and a representative icon which does not includes an icon that indicates the imaging position of the image file the user focuses on can be displayed in a distinguishable manner. In this case, if the representative icon of the focused icons is displayed in a form similar to the focused icon, the user may intuitively recognize that a focused icon is combined into the representative icon. For example, the representative icon that includes a focused icon may be displayed using a color same as the focused icon. Whether an image file is the file the user focuses in the timeline display mode can be determined by the user referring to the list of the focused image files.

Next, procedures for combining icons will be described. FIG. 5B illustrates a display example when the icons displayed in a combined manner as the representative icon 504 in FIG. 5A are displayed separately. In FIG. 5B, the icons combined into the representative icon 504 in FIG. 5A are displayed as an icon group 507. FIG. 5C illustrates an enlarged portion of the icon group 507.

First, the control unit 101 determines a display position of icons that should be displayed in the display area. Wherein, for example, the control unit 101 performs as a determination unit. And next, starting from an icon at an upper left portion of the display area, the control unit 101 determines whether a display position of a different icon is included in a predetermined distance from a display position of the icon at the upper left portion. According to the example in FIG. 5C, the control unit 101 uses the display position of a focused icon 508 as a reference position and determines whether a display position of another icon is included in a predetermined distance. Wherein, for example, the control unit 101 performs as a decision unit.

In FIG. 5C, a display position of a non-focused icon 509 is included in the predetermined distance. In such a case, if there is no other icons to be combined in the predetermined distance, the focused icon 508 and the non-focused icon 509 are combined into a representative icon 510, and the representative icon 510 is displayed in an intermediate position between the focused icon 508 and the non-focused icon 509.

When the intermediate position between the focused icon 508 and the non-focused icon 509 is obtained, similar processing is performed by using this intermediate position as a reference position before the representative icon 510 is displayed. According to the example in FIG. 5C, further, a focused icon 511 exists within the predetermined distance from the display position of the representative icon 510. Thus, according to the above-described processing, the icons 509 to 511 are combined into a representative icon 512. The display position of the representative icon 512 is the intermediate position between the representative icon 510 and the focused icon 511.

A non-focused icon 513 also exists in FIG. 5C. However, since the display position of the non-focused icon 513 is not included in the predetermined distance from the display position of the representative icon 512, the non-focused icon 513 is not combined into the representative icon 512.

In this manner, the above-described processing is repeated until there is no other icons that can be combined. Lastly, when there are no other icons left that can be combined, then, the representative icon 512 is displayed in the display area. These are the combining procedures of the icons.

As described above, if at least one focused icon is included in the icons that are combined into a representative icon, even if a non-focused icon is mixed in the icons that are combined, the representative icon is displayed in a manner that the user can recognize that the representative icon includes a focused icon. In other words, if a representative icon includes at least a focused icon, the representative icon is displayed in a display form similar to that of the focused icon. Accordingly, even if the closely arranged icons are combined into a representative icon, the user can easily identify the icon which includes the focused image file.

Referring back again to FIG. 4, the processing in step S403 is executed in parallel with the processing in step S402. The icon is superimposed on the map image. In other words, if the processing in steps S402 and S403 is completed, the icon is superimposed on the map and displayed. Wherein, for example, the control unit 101 performs as a display control unit.

In step S404, the control unit 101 receives an instruction from the user via the operation unit 105. The processing in this step is executed in parallel with the processing in steps S401 to S403.

A switch button 503 is displayed in the screens in FIGS. 5A and 5B as is displayed in the screens in FIGS. 3A and 3B. By selecting the switch button 503 via the operation unit 105, the user can input an instruction to return the mode to the timeline display mode.

In addition, the user can input an instruction to change the scale of the map or change the display range via the operation unit 105. For example, an instruction to change the scale of the map can be input by the user rotating a mouse wheel. Further, an instruction to move the display range can be input by the user performing drag and drop operations. Further, by designating a displayed icon via the operation unit 105, the user can reproduce a thumbnail that corresponds to the icon. This processing will be described below.

In steps S405 to S408, the control unit 101 determines the instruction received in step S404. In step S405, the control unit 101 determines whether the instruction is an instruction to change the scale of the map. If it is determined that an instruction to change the scale of the map is received (YES in step S405), the processing proceeds to step S409.

In step S409, the control unit 101 determines the appropriate display range from the designated scale and the size of the display area of the window.

Then, the processing returns to step S402, and the control unit 101 reads out the map image of the determined display range of the designated scale from the recording medium 110, and displays the map image in the display area of the window. In step S403, the control unit 101 displays an icon corresponding to the image file having the imaging position included in the display range at a location corresponding to the imaging position on the map image.

Figure 6A:
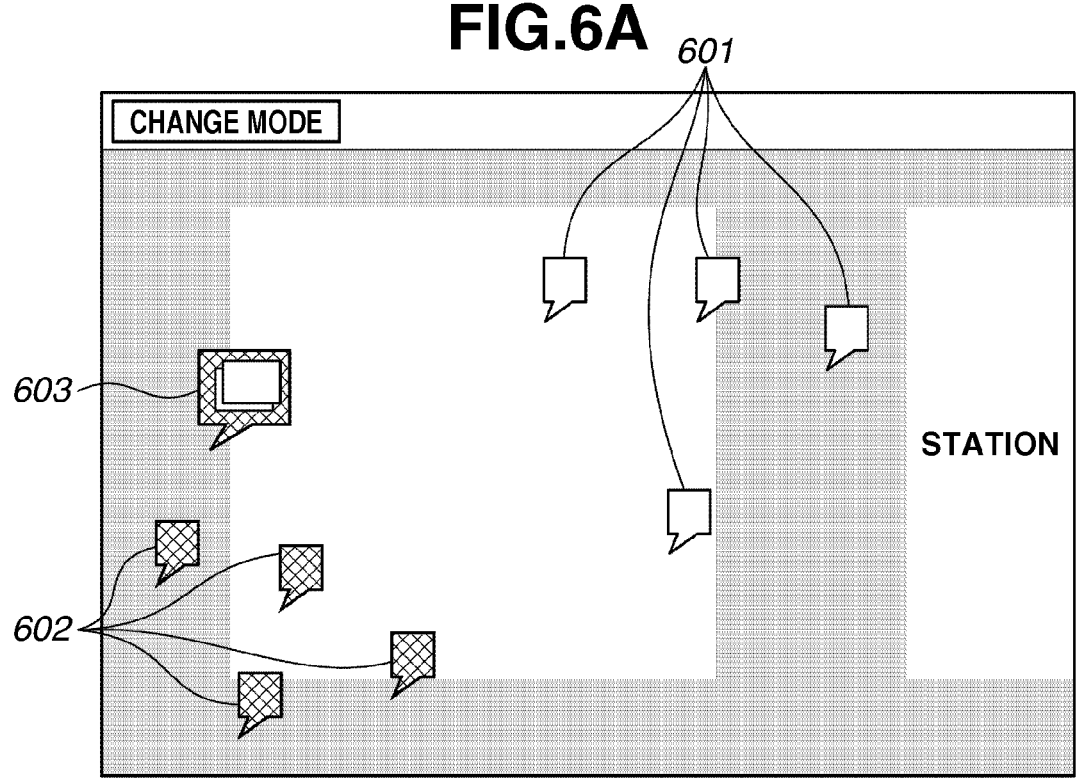
FIGS. 6A and 6B illustrate examples of the display screen in the map display mode according to the first exemplary embodiment.

FIG. 6A illustrates an example of a screen which is displayed when an instruction to enlarge the map illustrated in FIG. 5A is received. The display range in FIG. 6A is a region 506 enclosed by a broken line in FIG. 5A. According to the example in FIG. 6A, the icons which have been combined and displayed as the representative icon 505 in FIG. 5A are displayed separately as icons 601. The icons are displayed separately since the map is enlarged and the icons are sparsely distributed. In other words, since a portion in the display range in FIG. 5A is enlarged, the display positions of the icons are fully separated.

Although icons 602 are combined with a representative icon 603 into one representative icon in FIG. 5A, they are separately displayed in the map of the scale in FIG. 6A. Since the distances among some of the icons are still within the predetermined distance in the map of the scale in FIG. 6A, such icons are combined into the representative icon 603.

Figure 6B:
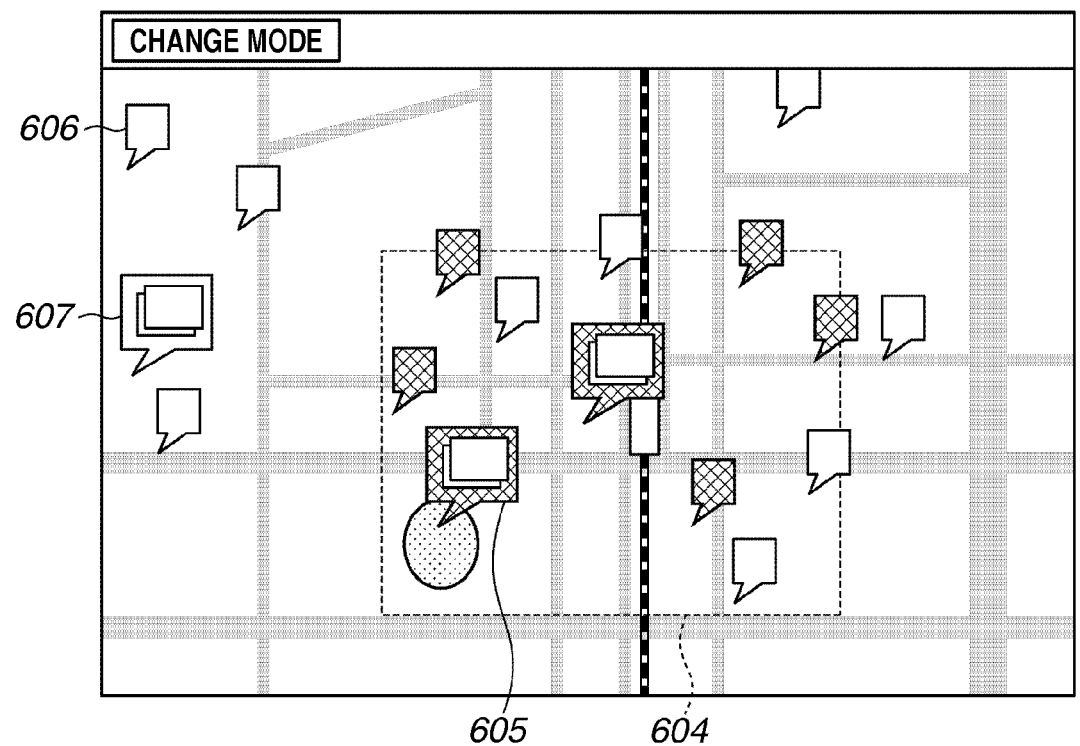

FIG. 6B is an example of a screen which is displayed when an instruction to reduce the scale of the map illustrated in FIG. 5A is received. A region 604 enclosed by a broken line in FIG. 6B corresponds to the display range in FIG. 5A. In step S401, if the region 604 is a range determined as a display range where the imaging positions of the focused image files fit in, the imaging positions of the image files the user does not focus on are displayed as an icon 606 and an icon 607 outside the region 604.

Further, according to the example in FIG. 6B, the icon 501 and the representative icon 504 displayed in FIG. 5A are combined and displayed as a representative icon 605. This is because, contrary to the case in FIG. 6A, since the scale is reduced, the display of the icons has become dense. In other words, since the display range in FIG. 5A is reduced in FIG. 6B, the distances among the display positions of the icons are less than the predetermined distance.

As described above, the distance between the display positions of the icons is changed when the scale is changed. Thus, when a scale of a map is changed, the icons that correspond to a plurality of image files may be displayed in a combined manner or the icons displayed in a combined manner may be displayed separately for each image file.

In step S406, if the control unit 101 determines that an instruction to move the display range is received (YES in step S406), the processing proceeds to step S410.

In step S410, the control unit 101 determines the display range according to the instruction.

Then, the processing returns to step S402, and the control unit 101 reads out a map image that corresponds to the display range determined in step S410 from the recording medium 110 and displays the map image in the display area of the window. Subsequent processing is similar to the processing which is performed when the processing returns to step S404 from step S408.

In step S407, if the control unit 101 determines that an instruction to designate an icon is received (YES in step S407), and then the processing proceeds to step S411.

Figure 7A:
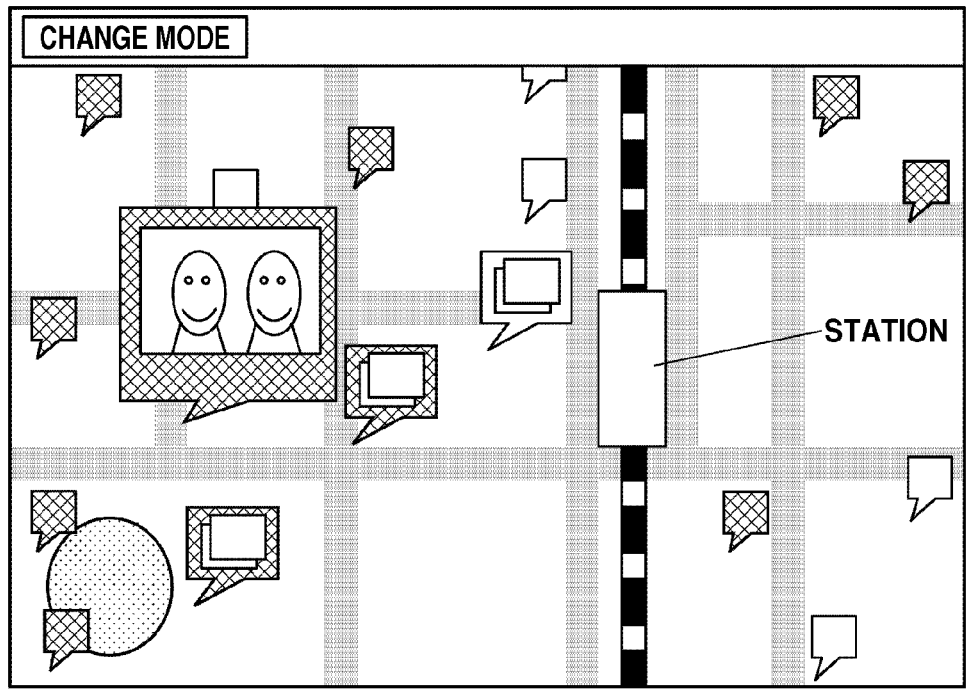
FIGS. 7A and 7B illustrate examples of the display screen in the map display mode according to the first exemplary embodiment.
Figure 7B:
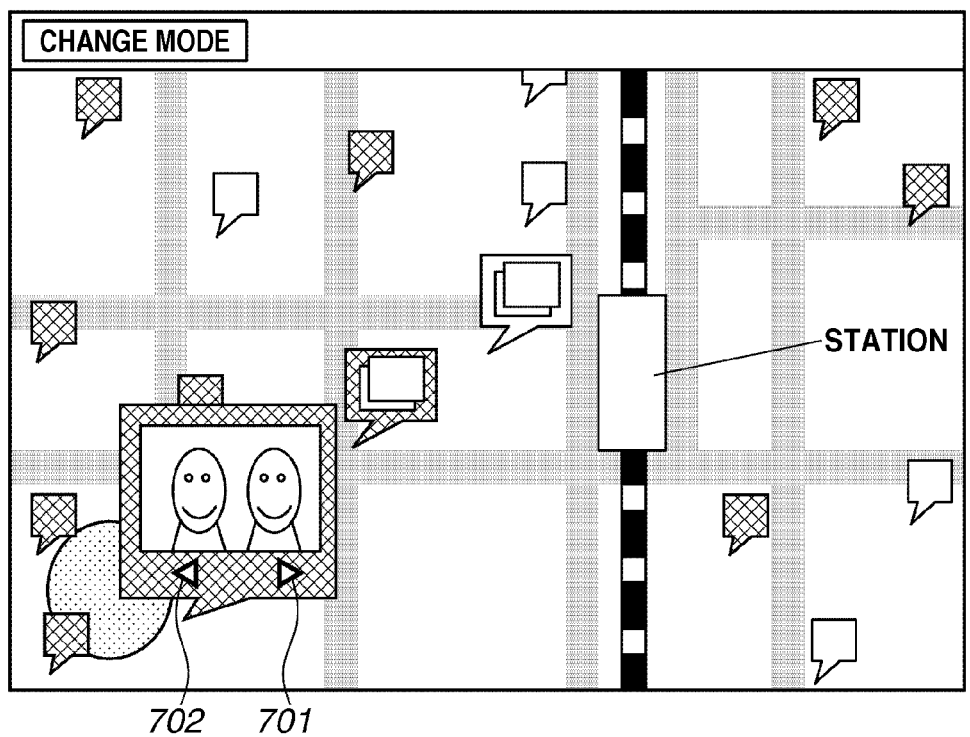

In step S411, the control unit 101 reproduces the thumbnail of the image file corresponding to the selected icon. Wherein, for example, the control unit 101 performs as a reproduction unit. For example, as illustrated in FIG. 7A, a balloon is displayed at the display position of the icon and the thumbnail is reproduced in the balloon. If a representative icon is designated, for example, an image forward button 701 and an image back button 702 are displayed as well as a thumbnail is displayed in a balloon as illustrated in FIG. 7B.

When the user selects either of these buttons, thumbnails corresponding to the respective icons combined to the representative icons can be sequentially reproduced. If the representative icon includes a focused icon, the display of a thumbnail corresponding to the focused icon is prioritized over a thumbnail corresponding to a non-focused icon. For example, the reproduction order is adjusted so that the thumbnail corresponding to the focused icon is reproduced before the non-focused icon. Accordingly, the focused image file can be reproduced more easily. Then, the processing returns to step S404, and the control unit 101 waits for the next instruction.

Further, in step S408, if the control unit 101 determines that an instruction to change the mode to the timeline display mode is received (YES in step S408), the processing in this flowchart is terminated, and the mode is changed to the timeline display mode. Information about the display range in the timeline which is displayed just before the mode is changed from the timeline display mode to the map display mode is stored. Thus, when the mode is changed again to the timeline display mode, the display range displayed just before the mode has been changed to the map display mode will be displayed again.

On the other hand, in step S408, if the control unit 101 determines that an instruction to change the mode to the timeline display mode is not received (NO in step S408), then the processing returns to step S404, and the control unit 101 waits for the next instruction.

The operation of the information processing apparatus in the map display mode is described above.

As described above, the icons of the image files displayed in the timeline display mode and the icons of the image files not displayed in the timeline display mode are distinguishably displayed in the map display mode according to the information processing apparatus of the present exemplary embodiment. Further, even if icons are combined into a representative icon, a representative icon that includes an icon corresponding to an image file which a user focuses on and a representative icon that does not include an icon corresponding to an image file which the user focuses on are distinguishably displayed. Accordingly, even if the icons are combined together, the possibility of the user losing sight of the content which the user focuses on can be reduced.

According to the above-described exemplary embodiment, when the thumbnails of the image files are displayed in a list, thumbnails are displayed based on the imaging date and time. However, the thumbnails can be displayed based on not only the imaging date and time but also various other indices, such as a name order, an update date, or of a file size. Further, the thumbnails may be displayed based on a plurality of indices. If the image files are uploaded to a different information processing apparatus and stored, the upload date and time can be stored for each image file. Then, such upload date and time may be used as the index. Accordingly, an appropriate display style can be used for finding the desired image file, so that a user can find the desired image file more easily.

Although image files are used as an example in the exemplary embodiment described above, similar processing can be applied to various types of content data such as a document file or a music file.

Further, according to the above-described exemplary embodiment, the timeline display and the map display are separately displayed. However, these two modes may be displayed on the screen at the same time. In this case, the update of the list of the focused image files in the timeline display mode and the display of the icons that indicate the imaging positions are performed in real time. Accordingly, the data that the user focuses on can be easily recognized in both display modes.

Further, according to the above-described exemplary embodiment, the user can distinguish the imaging positions of the focused images and the imaging positions of other images by changing the color of the icons that indicate the imaging positions in the map display mode. However, in place of changing the color of the icons, for example, the size or the shape of the icons may be changed. Further, the icons may be distinguished by combination of changing of the size and the shape.

Further, according to the above-described exemplary embodiment, the imaging positions of the image files are displayed using an icon in the map display mode. However, a thumbnail of an image file may be displayed at the imaging position in place of an icon. In this case, for example, the color of a display frame or the display size of the thumbnail may be changed according to whether the thumbnail is of a focused image or not. Accordingly, the user can easily distinguish the focused image and other images. Thus, the content of the image file and the imaging position thereof can be recognized at the same time. Further, according to the above-described exemplary embodiment, if the thumbnails are closely arranged and displayed, the thumbnails can be combined into one representative thumbnail. When the representative thumbnail is displayed, the thumbnails of the image files the user focuses on are prioritized over the non-focused thumbnails. Accordingly, the user can easily confirm the focused image file. Furthermore, although the thumbnails of the image files are displayed in the timeline display mode, they may also be displayed using the icons of the image files. If the icons of the image files are displayed, the load on the control unit 101 when the list is displayed can be reduced since the thumbnails are not necessarily read out.

In addition to the above-described exemplary embodiment, the information processing apparatus may be configured to change ON and OFF of the display to distinguish the focused images and other images.

Further, according to the above-described example of the timeline display, the thumbnails of the image files are displayed by the day. However, the thumbnails may be displayed by the week, the month, the year, or the like.

Further, according to the example of the timeline display described above, the thumbnails are scrolled horizontally. However, the thumbnails may be scrolled vertically.

Further, according to the example of the timeline display described above, the thumbnails of the image files are scrolled in/out. However, in place of scrolling, all the thumbnails which are displayed may be replaced by what is referred to as a page switch.

In addition to the above-described exemplary embodiment, a plurality of image files may be managed in a hierarchical manner using the information management application program. For example, a plurality of image files can be grouped into an album. In this case, for example, a user can select whether to display all the image files recorded in the recording medium 110 in the timeline display or to display only the image files included in the album selected by the user in the timeline display.

Generally, the number of image files in an album is relatively smaller compared to the number of image files recorded in the recording medium. Thus, if the mode is changed from the timeline display mode to the map display mode in a case where only the image files included in an album are displayed, the user is not likely to lose sight of the focused image file. Thus, if only the image files included in an album are displayed in the timeline display, the list of the focused images may need not be managed. In other words, if only the image files included in an album are displayed by the timeline display, even if the mode is changed to the map display mode, the icon of the image displayed in the timeline display mode and the icons of other images are displayed in an indistinguishable manner. In this case, a map having a display range and scale including the imaging positions of all the image files included in the album is displayed.

Further, according to the above-described exemplary embodiment, when icons are combined, the icons are combined according to a certain reference regardless of whether the icon to be combined is a focused icon or a non-focused icon. However, the icons may be combined such that a group of icons including only the focused icons (or non-focused icons) may be combined more easily compared to a case where a group of icons including the focused icons and the non-focused icons are combined.

As for the above-described exemplary embodiment, when a focused icon and a non-focused icon are combined, the predetermined distance is set to a shorter distance compared to a case where only the focused icons are combined (or where only the non-focused icons are combined). In other words, if the focused icon and the non-focused icon are not closely arranged compared to a case where only the focused icons (or non-focused icons) are combined, they are not combined into one icon. Accordingly, the focused icon and the non-focused icon are less likely to be combined, and the user can display the focused image file more easily.

Further, according to the above-described exemplary embodiment, the focused icon and the non-focused icon are combined into one icon. However, the focused icons may be combined into an icon and the non-focused icons may be combined into a different icon. In other words, the focused icon and the non-focused icon are not combined into an icon. If the focused icon and the non-focused icon are not mixed to be combined into an icon, the user can display the focused image file more easily.

In addition to the above-described exemplary embodiment, the focused icon may be prioritized over the non-focused icon when an icon is to be superposed on another icon. For example, the focused icon is superposed on the non-focused icon. Accordingly, the user can display the focused image file more easily.

In addition to the above-described exemplary embodiment, when icons are combined, the size of the combined icon may be changed according to the number of the icons which have been combined. For example, a large icon is displayed if a large number of icons are combined.

Further, according to the above-described exemplary embodiment, icons are combined based on a distance between the icons. However, the method for combining icons is not limited to such a method. For example, the map may be divided into meshed regions so that the icons displayed in each region may be combined.

Further, according to the above-described exemplary embodiment, if a representative icon is selected, the thumbnails are displayed one by one out of a plurality of thumbnails corresponding to the icons which have been combined. However, if a larger display area is provided for a balloon, thumbnails of a plurality of image files may be displayed in the display area.

In addition to the exemplary embodiment described above, a display target image may be subjected to filtering according to various conditions. For example, images are subjected to filtering according to the imaging date and time, and only the image captured on a specific date and time may be handled as the focused image file. Alternatively, for example, images is subjected to filtering based on a rating value arbitrarily added to each image by the user, and only the image to which a specific rating is added may be handled as the focused image file. Accordingly, among the image files that match the filtering condition, the image file which is not the focused image file before the filtering may be regarded as the focused image file. Alternatively, among the image files that match the filtering condition, only the image file which is the focused image file before the filtering may be regarded as the focused image file. The filtering condition can be set using a plurality of conditions by combining AND condition and OR condition.

Further, when the mode is set to the above-described map display mode, the display of the icon indicating the existence of the image file is distinguished based on whether the thumbnail of the image file has been displayed in the timeline display mode. However, the display of the icon indicating the existence of the image file may be determined based on whether the image file has been displayed in a mode other than the timeline display mode. Alternatively, the display of the icon indicating the existence of the image file may be determined based on whether the image file has been displayed in the map display mode before the change in the scale.

Aspects of the present disclosure can also be realized by a computer of a system or apparatus (or devices such as a CPU, a micro processing unit (MPU), and/or the like) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a non-transitory computer-readable medium).

While the present disclosure has been described with reference to exemplary embodiments, it is to be understood that the disclosure is not limited to the disclosed exemplary embodiments. The scope of the following claims is to be accorded the broadest interpretation so as to encompass all modifications, equivalent structures, and functions.

This application claims priority from Japanese Patent Application No. 2012-010267 filed Jan. 20, 2012, which is hereby incorporated by reference herein in its entirety.

What is claimed is:

1. An information processing apparatus comprising:
a memory for storing data and a computer program; and
a processor coupled to the memory for executing the computer program, the computer program comprising instructions for:
displaying, on a display unit, information about content data;
acquiring a plurality of content data pieces and attribute information including position information about the content data;

determining a display position of information indicating existence of the content data based on the position information about the content data;

determining whether the existence of the plurality of content data pieces is to be displayed using individual information corresponding to each piece of the content data or using representative information that combines the content data pieces into one based on positional proximity of the display position of the information indicating existence of each piece of the content data;

controlling the display unit to display the individual information indicating existence of the content data which satisfies a predetermined condition based on time, and display the individual information indicating existence of the content data which does not satisfy the predetermined condition in a distinguishable manner;

controlling the display unit to display representative information which combines at least one of the plurality of content data pieces that satisfy the predetermined condition and representative information which combines content data that does not satisfy the predetermined condition in a distinguishable manner for intuitive recognition of the representative information;

controlling the display unit to display representative information, which combines at least one of the plurality of content data pieces which satisfy the predetermined condition and at least one of the plurality of content data pieces which does not satisfy the predetermined condition, and representative information which combines content data that does not satisfy the predetermined condition, in a distinguishable manner for intuitive recognition of the representative information; and controlling the display unit to display representative information, which combines at least one of the plurality of content data pieces which satisfy the predetermined condition and at least one of the plurality of content data pieces which does not satisfy the predetermined condition, and representative information which combines content data that satisfies the predetermined condition, in a similar display form.

2. The information processing apparatus according to claim 1, wherein the computer program further comprises instructions for causing representative information which combines at least one piece of information among information pieces about the plurality of content data pieces which are combined that satisfies the predetermined condition to have a display form similar to a display form of the individual information that satisfies the predetermined condition rather than a display form of the individual information that does not satisfy the predetermined condition.

3. The information processing apparatus according to claim 1, wherein computer program further comprises instructions for:
in a case where a distance between each display position of some information pieces among the information pieces indicating the existence of the plurality of content data pieces, is longer than a predetermined distance, controlling the display unit to display the existence of the plurality of content data pieces using each individual information thereof.

4. The information processing apparatus according to claim 3, wherein the computer program further comprises instructions for controlling the display unit to display the information about the content data on a map, and
wherein the predetermined distance is changed according to a scale of the map.

5. The information processing apparatus according to claim 3, wherein the predetermined distance which is used in determining whether information that satisfies the predetermined condition and information that does not satisfy the predetermined condition are combined is shorter than the predetermined distance which is used in determining whether two or more pieces of information that do not satisfy the predetermined condition are combined.

6. The information processing apparatus according to claim 1, wherein in a case where the existence of the plurality of content data is displayed using the representative information that combines the content data pieces into one, the content data pieces are combined and displayed regardless of whether the plurality of content data satisfies the predetermined condition or not.

7. The image processing apparatus according to claim 1, wherein the receiving receives designation of information about the content data,
wherein the computer program further comprises instructions for controlling the display unit to reproduce the content data corresponding to designated information, and
wherein if representative information including information that satisfies the predetermined condition is designated, controlling the display unit to prioritize reproduction of content data corresponding to the information that satisfies the predetermined condition.

8. The information processing apparatus according to claim 1, wherein whether information about the content data satisfies the predetermined condition is determined based on whether the content data is data that a user focuses on.

9. The information processing apparatus according to claim 1, wherein the computer program further comprises instructions for including a first display mode for displaying information indicating existence of the content data and a second display mode for displaying information about the content data in an arrangement based on attribute information other than position information, and
wherein the predetermined condition is a condition based on whether the content data is content data of which related information is displayed when an instruction to change the second display mode to the first display mode is detected.

10. The information processing apparatus according to claim 9, wherein the attribute information includes date and time information, and
wherein, in the second display mode, information about the content data is displayed in an arrangement based on the date and time information.

11. A method for controlling an information processing apparatus, the method comprising:
displaying, on a display unit, information about content data;
acquiring a plurality of content data pieces and attribute information including position information about the content data;
determining a display position of information indicating existence of the content data based on the position information about the content data;
determining whether the existence of the plurality of content data pieces is to be displayed using individual information corresponding to each piece of the content data or using representative information that combines the content data pieces into one based on positional proximity of the display position of the information indicating existence of each piece of the content data;

controlling the display unit to display the individual information indicating existence of the content data which satisfies a predetermined condition based on time, and display the individual information indicating existence of the content data which does not satisfy the predetermined condition in a distinguishable manner;

controlling the display unit to display representative information which combines at least one of the plurality of content data pieces that satisfy the predetermined condition and representative information which combines content data that does not satisfy the predetermined information in a distinguishable manner for intuitive recognition of the representative information;

controlling the display unit to display representative information, which combines at least one of the plurality of content data pieces which satisfy the predetermined condition and at least one of the plurality of content data pieces which does not satisfy the predetermined condition, and representative information which combines content data that does not satisfy the predetermined condition, in a distinguishable manner for intuitive recognition of the representative information; and controlling the display unit to display representative information, which combines at least one of the plurality of content data pieces which satisfy the predetermined condition and at least one of the plurality of content data pieces which does not satisfy the predetermined condition, and representative information which combines content data that satisfies the predetermined condition, in a similar display form.

12. A non-transitory storage medium storing a computer-readable program for causing a computer to perform a method comprising:

displaying, on a display unit, information about content data;

acquiring a plurality of content data pieces and attribute information including position information about the content data;

determining a display position of information indicating existence of the content data based on the position information about the content data;

determining whether the existence of the plurality of content data pieces is to be displayed using individual information corresponding to each piece of the content data or using representative information that combines the content data pieces into one based on positional proximity of the display position of the information indicating existence of each piece of the content data;

controlling the display unit to display the individual information indicating existence of the content data which satisfies a predetermined condition based on time, and display the individual information indicating existence of the content data which does not satisfy the predetermined condition in a distinguishable manner;

controlling the display unit to display representative information which combines at least one of the plurality of content data pieces that satisfy the predetermined condition and representative information which combines content data that does not satisfy the predetermined condition in a distinguishable manner for intuitive recognition of the representative information;

controlling the display unit to display representative information, which combines at least one of the plurality of content data pieces which satisfy the predetermined condition and at least one of the plurality of content data pieces which does not satisfy the predetermined condition, and representative information which combines content data that does not satisfy the predetermined condition, in a distinguishable manner for intuitive recognition of the representative information; and controlling the display unit to display representative information, which combines at least one of the plurality of content data pieces which satisfy the predetermined condition and at least one of the plurality of content data pieces which does not satisfy the predetermined condition, and representative information which combines content data that satisfies the predetermined condition, in a similar display form.

* * * * *